United States Patent
Hu et al.

(10) Patent No.: US 11,905,192 B2
(45) Date of Patent: Feb. 20, 2024

(54) METHOD FOR COLLABORATIVE CONTROL OF ORGANIC NITROGEN AND INORGANIC NITROGEN IN DENITRIFICATION PROCESS

(71) Applicant: Nanjing University, Nanjing (CN)

(72) Inventors: Haidong Hu, Nanjing (CN); Xian Cui, Nanjing (CN); Kewei Liao, Nanjing (CN); Lili Ding, Nanjing (CN); Bing Wu, Nanjing (CN); Hongqiang Ren, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 156 days.

(21) Appl. No.: 17/588,274

(22) Filed: Jan. 29, 2022

(65) Prior Publication Data
US 2023/0212045 A1    Jul. 6, 2023

(30) Foreign Application Priority Data
Dec. 30, 2021 (CN) .......................... 202111652401.1

(51) Int. Cl.
*C02F 3/00* (2023.01)
*C02F 3/30* (2023.01)

(52) U.S. Cl.
CPC .............. *C02F 3/006* (2013.01); *C02F 3/305* (2013.01); *C02F 2209/06* (2013.01); *C02F 2209/08* (2013.01); *C02F 2209/10* (2013.01); *C02F 2209/16* (2013.01); *C02F 2209/22* (2013.01); *C02F 2209/44* (2013.01)

(58) Field of Classification Search
CPC ...... C02F 2209/08; C02F 3/006; C02F 3/305; C02F 2209/06; C02F 2209/14; C02F 2209/15; C02F 2209/16; C02F 2209/22; C02F 2209/44
USPC .......................................................... 210/614
See application file for complete search history.

(56) References Cited

FOREIGN PATENT DOCUMENTS

CN          110451661 A  * 11/2019  .............. C02F 3/006

OTHER PUBLICATIONS

English machine translation, Hu et al., CN 10451661A, p. 1-9 (Year: 2019).*

* cited by examiner

*Primary Examiner* — Claire A Norris
(74) *Attorney, Agent, or Firm* — MATTHIAS SCHOLL P.C.; Matthias Scholl (57) ABSTRACT

A method for collaborative optimization control method for organic nitrogen and inorganic nitrogen in a denitrification process is provided. The method includes: establishing ASM-mDON-DIN models for simultaneous simulation of microbial dissolved organic nitrogen (mDON) and inorganic nitrogen (DIN) in denitrification processes; and selecting a corresponding ASM-mDON-DIN model according to a set carbon/nitrogen ratio to collaboratively optimize the concentration values of mDON and DIN in the effluent in the denitrification process, to obtain best process operation parameter values.

8 Claims, 1 Drawing Sheet

METHOD FOR COLLABORATIVE CONTROL OF ORGANIC NITROGEN AND INORGANIC NITROGEN IN DENITRIFICATION PROCESS

CROSS-REFERENCE TO RELAYED APPLICATIONS

Pursuant to 35 U.S.C. § 119 and the Paris Convention Treaty, this application claims foreign priority to Chinese Patent Application No. 202111652401.1 filed Dec. 30, 2021, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to the field of wastewater treatment, and more particularly to a method for collaborative control of organic nitrogen and inorganic nitrogen in a denitrification process.

The total dissolved nitrogen in sewage includes inorganic nitrogen (DIN) and dissolved organic nitrogen (DON). In many areas, a high standard is required for the discharge threshold of total nitrogen (TN) in the effluent from municipal sewage treatment plants, so as to control the eutrophication and anoxia of the received water body. For this standard, some sewage plants adopt post denitrification or other processes to improve the denitrification efficiency. When the concentration of the total nitrogen is low (<10 mg/L), 20% to 40% of the total nitrogen in the effluent from the sewage treatment plant exists in the form of DON. Therefore, the DON in the effluent is one of key factors to limit the lower concentration of total nitrogen in the effluent from the sewage treatment plant. The total nitrogen in the effluent from the sewage plant is affected by the removal rage of DIN and is also directly related to the concentration of DON. Therefore, in order to realize the standard discharge of total nitrogen in the effluent from the sewage plant under high standards, it is necessary to collaboratively control organic nitrogen and inorganic nitrogen.

At present, the researches on the control of total nitrogen in the effluent mainly focus on the simulation and optimization control of organic nitrogen, but do not focus on the collaborative control of inorganic nitrogen and organic nitrogen. The International Water Association (IWA) has been committed to the construction and practice of the mathematical denitrification model for activated sludge in sewage treatment for a long term. The IWA pays more attention to the transformation kinetic parameters of inorganic nitrogen and the nitrogen balance in wastewater biological treatment systems. For example, the activated sludge nitrogen model issued in 2008 by the IWA described the transformation and removal of DIN components (ammonia nitrogen, nitrate nitrogen and nitrite nitrogen) during the complete denitrification process of the activated sludge but did not consider microbial dissolved organic nitrogen (mDON) produced by microbial metabolism in the denitrification effluent, so the DIN and DON in the effluent could not be simulated simultaneously.

SUMMARY

An objective of the disclosure is to solve the problem that the total nitrogen in the effluent from a sewage plant is difficult to satisfy the standard discharge under high standards. Based on the activated sludge denitrification model of the IWA, a transformation mathematical model for simultaneous simulation of DON and DIN in a sewage biological treatment system is firstly constructed to realize the simultaneous simulation and collaborative operation control of DON and DIN in the effluent from a sewage plant, so that a new method is provided to satisfy the standard discharge of total nitrogen in the sewage plant under high standards.

A method for collaborative optimization control method for organic nitrogen and inorganic nitrogen in a denitrification process is provided, the method comprising:
  S1: establishing ASM-mDON-DIN models for simultaneous simulation of microbial dissolved organic nitrogen (mDON) and inorganic nitrogen (DIN) in denitrification processes; and
  S2: selecting a corresponding ASM-mDON-DIN model according to a set carbon/nitrogen ratio to collaboratively optimize the concentration values of mDON and DIN in the effluent in the denitrification process, to obtain best process operation parameter values.

In a class of this embodiment, in S1, operations for establishing the ASM-mDON-DIN models comprise:
  S1-1: data collection: measuring the chemical oxygen demand (COD), total nitrogen (TN), inorganic nitrogen (iDIN), dissolved organic nitrogen (rDON) and pH in the influent of a target sewage plant in the denitrification process, the inorganic nitrogen (eDIN) and dissolved organic nitrogen (eDON) in the effluent, dissolved oxygen (DO), the hydraulic retention time (t) of the denitrification stage, and the mixed liquor suspended solid (MLSS) of activated sludge;
  S1-2: model construction: according to the kinetic process of production, transformation and consumption of mDON during the complete denitrification process, adding mDON as a new component and the carbon/nitrogen ratio as a new parameter into the ASM model, and constructing ASM-mDON-DIN models 1 and 2 at different carbon/nitrogen ratios by using mDON and DIN as objects;
  S1-3: model initialization: initializing the models based on the data collected in S1-1, the measured values of model parameters and the ASM-mDON-DIN models constructed in S1-2;
  S1-4: model calibration: calibrating the parameter estimation function based on the simulated mDON and DIN kinetics and the result of sensitivity analysis; and
  S1-5: model establishment: replacing the initial parameter values in the models with the parameter calibration values to obtain calibrated ASM-mDON-DIN models 1 and 2.

In a class of this embodiment, in S3, operations for selecting collaborative optimization parameters comprise:
  S2-1: setting process parameter values: determining the set values of carbon/nitrogen ratio, pH and dissolved oxygen;
  S2-2: model selection: selecting the ASM-mDON-DIN model 1 or 2 according to the numerical value of the carbon/nitrogen ratio in S2-1;
  S2-3: collaborative optimization: based on the model selected in S2-2, obtaining the minimum value of the sum of the concentration of organic nitrogen and the concentration of inorganic nitrogen in the effluent and corresponding process operation parameters by using the process parameter values set in S2-1 as a design factor of the response surface methodology and the sum of the concentration of organic nitrogen and the concentration of inorganic nitrogen in the effluent as a response value; and S2-4: outputting best parameter values: outputting the minimum value of the sum of the concentration of inorganic nitrogen and the concentration of organic nitrogen in the effluent and the corresponding process operation parameters, i.e., carbon/nitrogen ratio, pH and dissolved oxygen, obtained in S2-3.

In a class of this embodiment, the measured values of model parameters comprise the initial values of the yield coefficient ($Y_H$) of anoxic growth of heterotrophic bacteria measured based on the data collected in S1-1, the proportion ($f_{H,DON}$) of mDON formed by heterotrophic bacteria based on organism growth, the ammoniated mDON half-saturation constant ($K_{H,DON}$) of heterotrophic bacteria, the maximum specific growth rate ($\mu_H$) of heterotrophic bacteria and the nitrate half-saturation constant ($K_{NO_3}$) of heterotrophic bacteria.

In a class of this embodiment, the inorganic nitrogen component $S_{DIN}$ comprises ammonia nitrogen, nitrate nitrogen and nitrite nitrogen.

In a class of this embodiment, the ASM-mDON-DIN model 1 comprises 10 components, 8 processes, 22 parameters and a kinetic parameter, i.e., the inhibition constant ($K_{I4S_s}$) of the anoxic substrate of heterotrophic bacteria; and, the ASM-mDON-DIN model 2 comprises 10 components, 8 processes and 22 parameters:

10 components: heterotrophic bacteria $X_H$, particulate inert substance Xi, dissolved biodegradable organic matter $S_S$, microbial organic nitrogen $S_{mDON}$, ammonia nitrogen $S_{NH}$, nitrate nitrogen $S_{NO3}$, nitrite nitrogen $S_{NO2}$, nitric oxide $S_{NO}$, nitrous oxide $S_{N2O}$ and alkalinity $S_{ALK}$;

8 processes: four-step anoxic growth of heterotrophic bacteria based on the dissolved biodegradable organic matter, comprising conversion of nitrate nitrogen into nitrite nitrogen, conversion of nitrite nitrogen into nitric oxide, conversion of nitric oxide into nitrous oxide and conversion of nitrous oxide into nitrogen, and decay of heterotrophic bacteria, ammonification of microbial dissolved organic nitrogen, assimilative reduction of nitrate nitrogen into nitrite nitrogen and assimilative reduction of nitrite nitrogen into ammonia nitrogen; and 22 parameters: the yield coefficient $Y_H$ of anoxic $S_s$-based growth of heterotrophic bacteria, the oxygen containing proportion $i_{XB}$ of organism, the proportion $f_{H,DON}$ of mDON formed by heterotrophic bacteria based on organism growth, the proportion $f_I$ of inert substances produced by organism, the maximum specific growth rate $\mu_H$ of anoxic growth of heterotrophic bacteria, the half-saturation utilization constant $K_s$ of the substrate of heterotrophic bacteria, the ammonia half-saturation constant $K_{H,NH}$ of heterotrophic bacteria, the anoxic growth factor $\eta_2$ of heterotrophic bacteria in the process 2, the anoxic growth factor $\eta_3$ of heterotrophic bacteria in the process 3, the anoxic growth factor $\eta_4$ of heterotrophic bacteria in the process 4, the nitrate nitrogen half-saturation constant $K_{NO_3}$, the nitrite nitrogen half-saturation constant $K_{NO_2}$, the nitric oxide half-saturation constant $K_{NO}$, the nitrous oxide half-saturation constant $K_{N_2O}$, the decay coefficient $b_H$ of heterotrophic bacteria, the ammoniated mDON half-saturation constant $K_{H,DON}$ of heterotrophic bacteria, the ammonification rate $\kappa_\alpha$ of microbial dissolved organic nitrogen, the $NO_3^-$—N half-saturation constant $K_{7,NO3}$ of ANRA, the inhibition constant $K_{I7NH}$ of ammonia nitrogen in the ANRA process, the inhibition constant $K_{I8,NO2}$ of nitrite nitrogen in the ANRA process, the half-saturation constant $K_{8,NO2}$ of nitrite nitrogen in the ANRA process and the oxygen half-saturation constant $K_{H,O}$ of heterotrophic bacteria.

In a class of this embodiment, the ASMN-mDON-DIN models 1 and 2 are divided according to the carbon/nitrogen ratio in the influent:

(1) when the carbon/nitrogen ratio is less than or equal to 4, the model 1 is selected, and the kinetic equations for the model 1 are as follows:

$$DIN(S_{DIN}): \frac{dS_{DIN}}{dt} =$$

$$\left(-i_{XB} - \frac{f_{H,DON}}{Y_H}\right)(V_1 + V_2 + V_3 + V_4) + V_6 + \left(-\frac{1 + 2.86 f_{H,DON}}{0.571 Y_H} + \frac{1}{0.571}\right)V_2;$$

$$mDON(S_{mDON}): \frac{dS_{mDON}}{dt} = \frac{f_{H,DON}}{Y_H}(V_1 + V_2 + V_3 + V_4) - V_6;$$

$$\text{heterotrophic bacteria}(X_H): \frac{dX_H}{dt} = V_1 + V_2 + V_3 + V_4 - V_5;$$

$$\text{particulate inert substance}(X_I): \frac{dX_I}{dt} = f_I V_5;$$

$$\text{dissolved biodegradable organic matter}(S_S): \frac{dS_s}{dt} = -\frac{1}{Y_H}(V_1 + V_2 + V_3 + V_4) - 1.14 V_7 - 3.43 V_8;$$

$$\text{nitric oxide}(S_{NO}): \frac{dS_{NO}}{dt} =$$

$$\left(\frac{1 + 2.86 f_{H,DON}}{0.571 Y_H} - \frac{1}{0.571}\right)V_2 + \left(-\frac{1 + 2.86 f_{H,DON}}{0.571 Y_H} + \frac{1}{0.571}\right)V_3;$$

$$\text{nitrous oxide}(S_{N2O}): \frac{dS_{N2O}}{dt} =$$

$$\left(\frac{1 + 2.86 f_{H,DON}}{0.571 Y_H} - \frac{1}{0.571}\right)V_3 + \left(-\frac{1 + 2.86 f_{H,DON}}{0.571 Y_H} + \frac{1}{0.571}\right)V_4;$$

$$\text{alkalinity}(S_{ALK}): \frac{dS_{ALK}}{dt} = \left(-\frac{i_{XB}}{14} - \frac{f_{H,DON}}{14 Y_H}\right)V_1 - \left(\frac{i_{XB}}{14} + \frac{f_{H,DON}}{14 Y_H} - \frac{1 + 2.86 f_{H,DON} - Y_H}{14 \cdot (0.571 Y_H)}\right)V_2 +$$

$$\left(-\frac{i_{XB}}{14} - \frac{f_{H,DON}}{14 Y_H}\right)V_3 + \left(-\frac{i_{XB}}{14} - \frac{f_{H,DON}}{14 Y_H}\right)V_4 + \frac{1}{14}V_6 + \frac{1}{7}V_8;$$

(2) when the carbon/nitrogen ratio is greater than 4, the model 2 is selected, and the kinetic equations for the model 2 are as follows:

$$DIN(S_{DIN}): \frac{dS_{DIN}}{dt} =$$

$$\left(-i_{XB} - \frac{f_{H,DON}}{Y_H}\right)(V_1 + V_2' + V_3 + V_4') + V_6 + \left(-\frac{1 + 2.86 f_{H,DON}}{0.571 Y_H} + \frac{1}{0.571}\right)V_2';$$

$$mDON(S_{mDON}): \frac{dS_{mDON}}{dt} = \frac{f_{H,DON}}{Y_H}(V_1 + V_2' + V_3 + V_4') - V_6;$$

$$\text{heterotrophic bacteria}(X_H): \frac{dX_H}{dt} = V_1 + V_2' + V_3 + V_4' - V_5;$$

$$\text{particulate inert substance}(X_I): \frac{dX_I}{dt} = f_I V_5;$$

-continued dissolved biodegradable organic matter($S_S$): $\frac{dS_s}{dt} = -\frac{1}{Y_H}(V_1 + V_2' + V_3 + V_4') - 1.14V_7 - 3.43V_8$;

nitric oxide($S_{NO}$): $\frac{dS_{NO}}{dt} = \left(\frac{1+2.86f_{H,DON}}{0.571Y_H} - \frac{1}{0.571}\right)V_2' + \left(-\frac{1+2.86f_{H,DON}}{0.571Y_H} + \frac{1}{0.571}\right)V_3$;

nitrous oxide($S_{N2O}$): $\frac{dS_{N2O}}{dt} = \left(\frac{1+2.86f_{H,DON}}{0.571Y_H} - \frac{1}{0.571}\right)V_3 + \left(-\frac{1+2.86f_{H,DON}}{0.571Y_H} + \frac{1}{0.571}\right)V_4'$;

alkalinity($S_{ALK}$): $\frac{dS_{ALK}}{dt} = \left(-\frac{i_{XB}}{14} - \frac{f_{H,DON}}{14Y_H}\right)V_1 - \left(\frac{i_{XB}}{14} + \frac{f_{H,DON}}{14Y_H} - \frac{1+2.86f_{H,DON} - Y_H}{14\cdot(0.571Y_H)}\right)V_2' + \left(-\frac{i_{XB}}{14} - \frac{f_{H,DON}}{14Y_H}\right)V_3 + \left(-\frac{i_{XB}}{14} - \frac{f_{H,DON}}{14Y_H}\right)V_4' + \frac{1}{14}V_6 + \frac{1}{7}V_8$.

In a class of this embodiment, the ASMN-mDON-DIN models 1 and 2 comprise 8 process rate expressions respectively, i.e., $V_1$-$V_8$ and $V_1'$-$V_8'$:

(1) the anoxic growths ($V_1$ and $V_1'$) of heterotrophic bacteria based on dissolved biodegradable organic matters (Ss) are:

$V_1 = \mu_H \cdot X_H(t) \cdot M_{H,S_s}(t) \cdot M_{H,NH}(t) \cdot M_{H,NO_3}(t) \cdot M_{H,O}(t)$ $V_1' = V_1$ (2) the anoxic growths ($V_2$ and $V_2'$) of heterotrophic bacteria based on dissolved biodegradable organic matters are:

$V_2 = \mu_H \cdot \eta_2 \cdot X_H(t) \cdot M_{H,S_s}(t) \cdot M_{H,NH}(t) \cdot M_{H,NO_2}(t) \cdot M_{H,O}(t)$ $V_2' = \alpha \cdot \mu_H \cdot \eta_2 \cdot X_H(t) \cdot M_{H,S_s}(t) \cdot M_{H,NH}(t) \cdot M_{H,NO_2}(t) \cdot M_{H,O}(t)$ (3) the anoxic growths ($V_3$ and $V_3'$) of heterotrophic bacteria based on dissolved biodegradable organic matters are:

$V_3 = \mu_H \cdot \eta_3 \cdot X_H(t) \cdot M_{H,S_s}(t) \cdot M_{H,NH}(t) \cdot M_{H,NO}(t) \cdot M_{H,O}(t)$ $V_3' = V_3$ (4) the anoxic growths ($V_4$ and $V_4'$) of heterotrophic bacteria based on dissolved biodegradable organic matters are:

$V_4 = \mu_H \cdot \eta_4 \cdot X_H(t) \cdot M_{H,I,S_s}(t) \cdot M_{H,NH}(t) \cdot M_{H,N_2O}(t) \cdot M_{H,O}(t)$ $V_4' = \alpha \cdot \mu_H \cdot \eta_4 \cdot X_H(t) \cdot M_{H,S_s}(t) \cdot M_{H,NH}(t) \cdot M_{H,N_2O}(t) \cdot M_{H,O}(t)$ (5) the decays ($V_5$ and $V_5'$) of heterotrophic bacteria are:

$V_5 = b_H \cdot M_{H,NO_3}(t) \cdot X_H(t)$ $V_5' = V_5$ (6) the ammonification ($V_6$ and $V_6'$) of microbial dissolved organic nitrogen is:

$V_6 = \kappa_\alpha \cdot X_H(t) \cdot M_{H,mDON}(t)$ $V_6' = V_6$ (7) the assimilative reduction ($V_7$ and $V_7'$) of nitrate into nitrite is:

$V_7 = 1.2 \cdot i_{XB} \cdot M_{ANRA,NO_3}(t) \cdot M_{I,NH}(t) \cdot M_{I7,NO_2}(t)(V_1+V_2+V_3+V_4-V_6)$ $V_7' = V_7$ (8) the assimilative reduction ($V_8$ and $V_8'$) of nitrite into ammonia nitrogen is:

$V_8 = 1.2 \cdot i_{XB} \cdot M_{ANRA,NO_2}(t) \cdot M_{I,NH}(t)(V_1+V_2+V_3+V_4-V_6)$ $V_8' = V_8$ where $M_{H,S_s}(t)$ is the Monod item of the substrate limit using the dissolved biodegradable organic matters of heterotrophic bacteria; $M_{H,I,S_s}(t)$ is the inhibition Monod item of the dissolved biodegradable organic matters of heterotrophic bacteria; $M_{H,NH}(t)$ is the Monod item of the substrate limit using ammonia nitrogen; $M_{H,O}(t)$ is the Monod item of the oxygen limit of heterotrophic bacteria; $M_{H,NO_3}(t)$ is the Monod item of the nitrate nitrogen limit; $M_{H,NO_2}(t)$ is the Monod item of the nitrite nitrogen limit; $M_{H,NO}(t)$ is the Monod item of the nitric oxide limit; $M_{H,N_2O}(t)$ is the Monod item of the nitrous oxide limit; $M_{ANRA,NO_3}(t)$ is the Monod item of the nitrate nitrogen limit during the assimilative reduction of nitrate into nitrite nitrogen; $M_{I,NH}(t)$ is the inhibition Monod item of ammonia nitrogen during the assimilative reduction of nitrate into nitrite nitrogen; $M_{I7,NO_2}(t)$ is the inhibition Monod item of nitrite during the assimilative reduction of nitrate into nitrite nitrogen; $M_{ANRA,NO_2}(t)$ is the Monod item of the nitrite limit during the assimilative reduction of nitrite nitrogen into ammonia nitrogen; and, $M_{H,mDON}(t)$ is the Monod item of the mDON limit produced by heterotrophic bacteria.

In a class of this embodiment, the sensitivity analysis uses an absolute-relative sensitivity equation to calculate the influences of parameter changes on mDON and DIN.

Preferably, except for five model parameter values to be measured, the initial values of the common chemometric coefficients and kinetic parameters of the ASM-mDON-DIN models 1 and 2 are shown in Table 1 below.

TABLE 1

Initial values of common chemometric coefficients and kinetic parameters of the ASM-mDON-DIN models 1 and 2

| Parameter | Unit | Numerical value |
|---|---|---|
| Chemometric coefficients | | |
| $i_{XB}$ | mg (N)/mg (COD$_{XH}$) | 0.086 |
| $f_1$ | mg (COD$_{XI}$)/mg (COD$_{XH}$) | 0.2 |
| Kinetic parameters | | |
| $K_s$ | mg (COD)/L | 20 |
| $N_{H, NH}$ | mg (NH$_3$-N)/L | 0.05 |
| $K_{H, O}$ | mgO$_2$/L | 0.2 |
| $n_2$ | — | 0.57 |
| $n_3$ | — | 1.25 |
| $n_4$ | — | 1.25 |
| $K_{NO_2}$ | mg N/L | 0.15 |
| $K_{I4S_s}$ | mg (COD)/L | 120 |
| $K_{NO}$ | mg N/L | 0.0003 |
| $K_{N_2O}$ | mg N/L | 1.1 |
| $b_H$ | mg (COD)/L | 0.62 |
| $K_{7, NO3}$ | mg N/L | 0.1 |

TABLE 1-continued

Initial values of common chemometric coefficients and kinetic parameters of the ASM-mDON-DIN models 1 and 2

| Parameter | Unit | Numerical value |
|---|---|---|
| $K_{INH}$ | mg N/L | 0.05 |
| $K_{8, NO2}$ | mg N/L | 0.1 |
| $k_a$ | L/(mg (N)·d) | 0.010 |
| $K_{I8NO2}$ | mg N/L | 0.05 |
| $K_{I4S_s}$ | mg (COD)/L | 120 |

Preferably, the Gujer matrix of the ASM-mDON-DIN models 1 and 2 is shown by Table 2:

TABLE 2

Gujer Matrix of the ASMN-DIN-mDON models 1 and 2

| | $S_S$ | $S_H$ | $X_1$ | $S_{mDON}$ | $S_{NH}$ | $S_{NO3}$ | $S_{NO2}$ | $S_{NO}$ | $S_{N2O}$ | $S_{ALK}$ |
|---|---|---|---|---|---|---|---|---|---|---|
| $V_1$ | $-\dfrac{1}{Y_H}$ | 1 | | $\dfrac{f_{H,DON}}{Y_H}$ | $-i_{XB} -$ $\dfrac{f_{H,DON}}{Y_H}$ | $1 + $ $-\dfrac{2.86 f_{H,DON}}{1.14 Y_H} + $ $\dfrac{1}{1.14}$ | $1 + $ $\dfrac{2.86 f_{H,DON}}{1.14 Y_H} -$ $\dfrac{1}{1.14}$ | | | $-\dfrac{i_{XB}}{14} -$ $\dfrac{f_{H,DON}}{14 Y_H}$ |
| $V_2$ | $-\dfrac{1}{Y_H}$ | 1 | | $\dfrac{f_{H,DON}}{Y_H}$ | $-i_{XB} -$ $\dfrac{f_{H,DON}}{Y_H}$ | | $1 + $ $-\dfrac{2.86 f_{H,DON}}{0.571 Y_H} +$ $\dfrac{1}{0.571}$ | $1 + $ $\dfrac{2.86 f_{H,DON}}{1.14 Y_H} -$ $\dfrac{1}{1.14}$ | | $-\dfrac{i_{XB}}{14} - \dfrac{f_{H,DON}}{14 Y_H} +$ $\dfrac{1 + 2.86 f_{H,DON} - Y_H}{14 \cdot (0.571 Y_H)}$ |
| $V_3$ | $-\dfrac{1}{Y_H}$ | 1 | | $\dfrac{f_{H,DON}}{Y_H}$ | $-i_{XB} -$ $\dfrac{f_{H,DON}}{Y_H}$ | | | $1 + $ $-\dfrac{2.86 f_{H,DON}}{0.571 Y_H} +$ $\dfrac{1}{0.571}$ | $1 + $ $\dfrac{2.86 f_{H,DON}}{1.14 Y_H} -$ $\dfrac{1}{1.14}$ | $-\dfrac{i_{XB}}{14} -$ $\dfrac{f_{H,DON}}{14 Y_H}$ |
| $V_4$ | $-\dfrac{1}{Y_H}$ | 1 | | $\dfrac{f_{H,DON}}{Y_H}$ | $-i_{XB} -$ $\dfrac{f_{H,DON}}{Y_H}$ | | | | $1 + $ $-\dfrac{2.86 f_{H,DON}}{0.571 Y_H} +$ $\dfrac{1}{0.571}$ | $-\dfrac{i_{XB}}{14} -$ $\dfrac{f_{H,DON}}{14 Y_H}$ |
| $V_5$ | | | $-1$ | $f_1$ | | | | | | |
| $V_6$ | | | | $-1$ | 1 | | | | | $\dfrac{1}{14}$ |
| $V_7$ | $-1.14$ | | | | | $-1$ | 1 | | | |
| $V_8$ | $-3.43$ | | | | 1 | | $-1$ | | | $\dfrac{1}{7}$ |

In a class of this embodiment, the influent of the denitrification process in the target sewage plant should satisfy the following conditions: 15° C.<environmental temperature<25° C., 2000 mg/L<sludge concentration<5000 mg/L, 10 d<sludge age<30 d, 0<carbon/nitrogen ratio≤6.5, 6.5<pH≤8.5, and 0≤dissolved oxygen≤0.5.

Compared with the prior art, the following advantages are associated with the method for collaborative control of organic nitrogen and inorganic nitrogen in a denitrification process of the disclosure:

(1) The ASMN-mDON-DIN models established in the disclosure can realize the simultaneous simulation and collaborative operation control of mDON and DIN, so that a new method is provided to satisfy the standard discharge of total nitrogen in the sewage plant under high standards.

(2) The ASMN-mDON-DIN models established in the disclosure are high in accuracy, and the degree of fitting $R^2$ between the simulated value and the measured value is greater than or equal to 0.9 (p<0.05).

DETAILED DESCRIPTION

The post denitrification process stage of a certain municipal sewage treatment plant was selected for collaborative optimization control of organic nitrogen and inorganic nitrogen, where the chemical oxygen demand (COD), total nitrogen (TN), inorganic nitrogen (dDIN), organic nitrogen (rDON) and pH of the influent were 46.33 mg/L, 18.465 mg/L, 16.98 mg/L, 1.48 mg/L and 6.53, respectively; the organic nitrogen (eDIN) and organic nitrogen (eDON) of the effluent were 11.97 mg/L and 2.26 mg/L, respectively; and, in the process operation parameters, the dissolved oxygen (DO) was 0.1 mg/L, the hydraulic retention time (t) of denitrification was 140 min, and the mixed liquor suspended solid (MLSS) of the activated sludge was 2600 mg/L. The specific evaluation steps were described below.

S1: ASM-mDON-DIN models for simultaneous prediction of microbial dissolved organic nitrogen (mDON) and inorganic nitrogen (DIN) in denitrification processes were established.

S1-1: The measurement results of model parameters were calculated according to the collected data: $Y_H$=0.58, $f_{H,DON}$=0.068, $\mu_H$=0.35, $K_{NO_3}$=0.12, $K_{H,mDON}$=1.55. The initial values of the remaining kinetic and chemometric parameters were shown in Table 1.

S1-2: According to the dynamic process of production, transformation and consumption of mDON during the complete denitrification process, mDON as a new component and the carbon/nitrogen ratio as a new condition were added into the ASM model, and ASM-mDON-DIN models 1 and 2 at different carbon/nitrogen ratios were constructed by using mDON and DIN as objects.

S1-3: Model initialization was performed on the ASM-mDON-DIN models 1 and 2.

S1-4: The influences of parameter changes on mDON and DIN were calculated by using an absolute-relative sensitivity equation after model initialization, and the parameter estimation function was calibrated based on the initially simulated mDON and DIN concentrations and the result of sensitivity analysis. The calibrated values of the models were shown in Table 3.

TABLE 3

Calibrated values of the ASMN-mDON-DIN models

| Parameter | Unit | Numerical value |
|---|---|---|
| Chemometric coefficient | | |
| $Y_H$ | mg($COD_{XH}$)/mg(N) | 0.591 |
| $f_{H,\,DON}$ | mg(N)/mg($COD_{XH}$) | 0.081 |
| Kinetic parameter | | |
| $\mu_H$ | 1/h | 0.296 |
| $K_{NO_3}$ | mg (N)/L | 0.098 |
| $K_{H,\,mDON}$ | mg (N)/L | 2.08 |
| $K_{I4S_s}$ | mg (COD)/L | 117 |

S1-5: The initial values of parameters in the models were replaced with the calibrated parameter values to obtain the rate equation of each component in the models 1 and 2:

Model 1:

$$S_{DIN}: \frac{dS_{DIN}}{dt} = $$
$$-0.22(0.296 \cdot X_H(t) \cdot M_{H,S_s}(t) \cdot M_{H,NH}(t) \cdot M_{H,NO_3}(t) \cdot M_{H,O}(t) + $$
$$0.37 \cdot X_H(t) \cdot M_{H,S_s}(t) \cdot M_{H,NH}(t) \cdot M_{H,NO}(t) \cdot M_{H,O}(t) + $$
$$0.37 \cdot X_H(t) \cdot M_{H,I,S_s}(t) \cdot $$
$$M_{H,NH}(t) \cdot M_{H,N_2O}(t) \cdot M_{H,O}(t)) + $$
$$0.01 \cdot X_H(t) \cdot M_{H,mDON}(t) - 0.03 \cdot X_H(t) \cdot M_{H,S_s}(t) \cdot $$
$$M_{H,NH}(t) \cdot M_{H,NO_2}(t) \cdot M_{H,O}(t)$$

$$S_{mDON}: \frac{dS_{mDON}}{dt} = $$
$$0.14(0.296 \cdot X_H(t) \cdot M_{H,S_s}(t) \cdot M_{H,NH}(t) \cdot M_{H,NO_3}(t) \cdot M_{H,O}(t) + $$
$$0.37 \cdot X_H(t) \cdot M_{H,S_s}(t) \cdot M_{H,NH}(t) \cdot M_{H,NO}(t) \cdot M_{H,O}(t) + $$
$$0.37 \cdot X_H(t) \cdot M_{H,I,S_s}(t) \cdot $$
$$M_{H,NH}(t) \cdot M_{H,N_2O}(t) \cdot M_{H,O}(t) + $$
$$0.17 \cdot X_H(t) \cdot M_{H,S_s}(t) \cdot M_{H,NH}(t) \cdot M_{H,NO_2}(t) \cdot $$
$$M_{H,O}(t)) - 0.01 \cdot X_H(t) \cdot M_{H,mDON}(t)$$

$$X_H: \frac{dX_H}{dt} = $$
$$0.296 \cdot X_H(t) \cdot M_{H,S_s}(t) \cdot M_{H,NH}(t) \cdot M_{H,NO_3}(t) \cdot M_{H,O}(t) + 0.37 \cdot X_H(t) \cdot $$
$$M_{H,S_s}(t) \cdot M_{H,NH}(t) \cdot M_{H,NO}(t) \cdot M_{H,O}(t) + 0.37 \cdot X_H(t) \cdot M_{H,I,S_s}(t) \cdot M_{H,NH}(t) \cdot $$
$$M_{H,N_2O}(t) \cdot M_{H,O}(t) + 0.17 \cdot X_H(t) \cdot M_{H,S_s}(t) \cdot M_{H,NH}(t) \cdot M_{H,NO_2}(t) \cdot M_{H,O}(t) - $$
$$0.62 \cdot M_{H,NO_3}(t) \cdot X_H(t)$$

$$X_I: \frac{dX_I}{dt} = 0.124 \cdot M_{H,NO_3}(t) \cdot X_H(t)$$

$$S_S: \frac{dS_s}{dt} = -1.69(0.296 \cdot X_H(t) \cdot M_{H,S_s}(t) \cdot M_{H,NH}(t) \cdot M_{H,NO_3}(t) \cdot M_{H,O}(t) + $$
$$0.37 \cdot X_H(t) \cdot M_{H,S_s}(t) \cdot M_{H,NH}(t) \cdot M_{H,NO}(t) \cdot M_{H,O}(t) + $$
$$0.37 \cdot X_H(t) \cdot M_{H,I,S_s}(t) \cdot $$
$$M_{H,NH}(t) \cdot M_{H,N_2O}(t) \cdot M_{H,O}(t) + $$
$$0.17 \cdot X_H(t) \cdot M_{H,S_s}(t) \cdot M_{H,NH}(t) \cdot M_{H,NO_2}(t) \cdot $$
$$M_{H,O}(t)) - $$
$$0.114 \cdot M_{ANRA,NO_3}(t) \cdot M_{I,NH}(t) \cdot M_{I7,NO_2}(t)(V_1 + V_2 + V_3 + V_4 - V_6) - 0.343 \cdot $$
$$M_{ANRA,NO_2}(t) \cdot M_{I,NH}(t)(V_1 + V_2 + V_3 + V_4 - V_6)$$

$$S_{NO}: \frac{dS_{NO}}{dt} = 1.90(0.17 \cdot X_H(t) \cdot M_{H,S_s}(t) \cdot M_{H,NH}(t) \cdot M_{H,NO_2}(t) \cdot M_{H,O}(t) - $$
$$0.37 \cdot X_H(t) \cdot M_{H,S_s}(t) \cdot M_{H,NH}(t) \cdot M_{H,NO}(t) \cdot M_{H,O}(t))$$

$$S_{N2O}: \frac{dS_{N2O}}{dt} = 1.90(0.37 \cdot X_H(t) \cdot M_{H,S_s}(t) \cdot M_{H,NH}(t) \cdot M_{H,NO}(t) \cdot M_{H,O}(t) - $$
$$0.37 \cdot X_H(t) \cdot M_{H,I,S_s}(t) \cdot M_{H,NH}(t) \cdot M_{H,N_2O}(t) \cdot M_{H,O}(t))$$

$$S_{ALK}: \frac{dS_{ALK}}{dt} = -0.005 \cdot X_H(t) \cdot M_{H,S_s}(t) \cdot M_{H,NH}(t) \cdot M_{H,NO_3}(t) \cdot M_{H,O}(t) - $$
$$0.02 \cdot X_H(t) \cdot M_{H,S_s}(t) \cdot M_{H,NH}(t) \cdot M_{H,NO_2}(t) \cdot M_{H,O}(t) - $$
$$0.006 \cdot X_H(t) \cdot M_{H,S_s}(t) \cdot $$
$$M_{H,NH}(t) \cdot M_{H,NO}(t) \cdot M_{H,O}(t) - $$
$$0.006 \cdot X_H(t) \cdot M_{H,I,S_s}(t) \cdot M_{H,NH}(t) \cdot M_{H,N_2O}(t) \cdot $$
$$M_{H,O}(t) + 0.07 \cdot \kappa_a \cdot X_H(t) \cdot M_{H,mDON}(t) + $$
$$0.141.2 \cdot i_{XB} \cdot M_{ANRA,NO_2}(t) \cdot M_{I,NH}(t)(V_1 + V_2 + V_3 + V_4 - V_6)$$

Model 2:

$$S_{DIN}: \frac{dS_{mDON}}{dt} =$$

$$-0.22\big(0.296 \cdot X_H(t) \cdot M_{H,S_s}(t) \cdot M_{H,NH}(t) \cdot M_{H,NO_3}(t) \cdot M_{H,O}(t) +$$

$$0.37 \cdot X_H(t) \cdot M_{H,S_s}(t) \cdot M_{H,NH}(t) \cdot M_{H,NO}(t) \cdot M_{H,O}(t) + 0.37 \cdot X_H(t) \cdot M_{H,S_s}(t) \cdot$$

$$M_{H,NH}(t) \cdot M_{H,N_2O}(t) \cdot M_{H,O}(t)\big) +$$

$$0.01 \cdot X_H(t) \cdot M_{H,mDON}(t) - 0.048 \cdot X_H(t) \cdot M_{H,S_s}(t) \cdot$$

$$M_{H,NH}(t) \cdot M_{H,NO_2}(t) \cdot M_{H,O}(t)$$

$$S_{Mdon}: \frac{dS_{mDON}}{dt} =$$

$$0.14\big(0.296 \cdot X_H(t) \cdot M_{H,S_s}(t) \cdot M_{H,NH}(t) \cdot M_{H,NO_3}(t) \cdot M_{H,O}(t) +$$

$$0.37 \cdot X_H(t) \cdot M_{H,S_s}(t) \cdot M_{H,NH}(t) \cdot M_{H,NO}(t) \cdot M_{H,O}(t) + 0.37 \cdot X_H(t) \cdot M_{H,S_s}(t) \cdot$$

$$M_{H,NH}(t) \cdot M_{H,N_2O}(t) \cdot M_{H,O}(t)\big) + 0.3 \cdot X_H(t) \cdot M_{H,S_s}(t) \cdot M_{H,NH}(t) \cdot M_{H,NO_2}(t) \cdot$$

$$M_{H,O}(t)\big) - 0.01 \cdot X_H(t) \cdot M_{H,mDON}(t)$$

$$X_H: \frac{dX_H}{dt} =$$

$$0.296 \cdot X_H(t) \cdot M_{H,S_s}(t) \cdot M_{H,NH}(t) \cdot M_{H,NO_3}(t) \cdot M_{H,O}(t) + 0.37 \cdot X_H(t) \cdot$$

$$M_{H,S_s}(t) \cdot M_{H,NH}(t) \cdot M_{H,NO}(t) \cdot M_{H,O}(t) +$$

$$0.37 \cdot X_H(t) \cdot M_{H,S_s}(t) \cdot M_{H,NH}(t) \cdot M_{H,N_2O}(t) \cdot$$

$$M_{H,O}(t)\big) +$$

$$0.3 \cdot X_H(t) \cdot M_{H,S_s}(t) \cdot M_{H,NH}(t) \cdot M_{H,NO_2}(t) \cdot M_{H,O}(t) - 0.62 \cdot M_{H,NO_3}(t) \cdot$$

$$X_H(t)$$

$$X_I: \frac{dX_I}{dt} = 0.124 \cdot M_{H,NO_3}(t) \cdot X_H(t)$$

$$S_S: \frac{dS_s}{dt} = -1.69\big(0.296 \cdot X_H(t) \cdot M_{H,S_s}(t) \cdot M_{H,NH}(t) \cdot M_{H,NO_3}(t) \cdot M_{H,O}(t) +$$

$$0.37 \cdot X_H(t) \cdot M_{H,S_s}(t) \cdot M_{H,NH}(t) \cdot M_{H,NO}(t) \cdot M_{H,O}(t) + 0.37 \cdot X_H(t) \cdot M_{H,S_s}(t) \cdot$$

$$M_{H,NH}(t) \cdot M_{H,N_2O}(t) \cdot M_{H,O}(t)\big) + 0.3 \cdot X_H(t) \cdot M_{H,S_s}(t) \cdot M_{H,NH}(t) \cdot M_{H,NO_2}(t) \cdot$$

$$M_{H,O}(t)\big) -$$

$$0.114 \cdot M_{ANRA,NO_3}(t) \cdot M_{I,NH}(t) \cdot M_{I7,NO_2}(t)(V_1 + V_2 + V_3 + V_4 - V_6) -$$

$$0.343 \cdot M_{ANRA,NO_2}(t) \cdot M_{I,NH}(t)(V_1 + V_2 + V_3 + V_4 - V_6)$$

$$S_{NO}: \frac{dS_{NO}}{dt} = 1.90 \cdot \big(0.30 \cdot X_H(t) \cdot M_{H,S_s}(t) \cdot M_{H,NH}(t) \cdot M_{H,NO_2}(t) \cdot M_{H,O}(t) -$$

$$0.37 \cdot X_H(t) \cdot M_{H,S_s}(t) \cdot M_{H,NH}(t) \cdot M_{H,NO}(t) \cdot M_{H,O}(t)\big)$$

$$S_{N2O}: \frac{dS_{N2O}}{dt} = 1.90 \cdot \big(0.37 \cdot X_H(t) \cdot M_{H,S_s}(t) \cdot M_{H,NH}(t) \cdot M_{H,NO}(t) \cdot M_{H,O}(t) -$$

$$0.37 \cdot X_H(t) \cdot M_{H,S_s}(t) \cdot M_{H,NH}(t) \cdot M_{H,N_2O}(t) \cdot M_{H,O}(t)\big)$$

$$S_{ALK}: \frac{dS_{ALK}}{dt} = -0.005 \cdot X_H(t) \cdot M_{H,S_s}(t) \cdot M_{H,NH}(t) \cdot M_{H,NO_3}(t) \cdot M_{H,O}(t) -$$

$$0.036 \cdot X_H(t) \cdot M_{H,S_s}(t) \cdot M_{H,NH}(t) \cdot M_{H,NO_2}(t) \cdot M_{H,O}(t) -$$

$$0.006 \cdot X_H(t) \cdot M_{H,S_s}(t) \cdot$$

$$M_{H,NH}(t) \cdot M_{H,NO}(t) \cdot M_{H,O}(t) -$$

$$0.006 \cdot X_H(t) \cdot M_{H,S_s}(t) \cdot M_{H,NH}(t) \cdot M_{H,N_2O}(t) \cdot$$

-continued $$M_{H,O}(t) + 0.007 \cdot X_H(t) \cdot M_{H,mDON}(t) +$$

$$0.014 \cdot M_{ANRA,NO_2}(t) \cdot M_{I,NH}(t)(V_1 + V_2 + V_3 + V_4 - V_6);$$

where $M_{H,S_s}(t)$ was the Monod item of the substrate limit using the dissolved biodegradable organic matters of heterotrophic bacteria; $M_{H,I,S_s}(t)$ was the inhibition Monod item of the dissolved biodegradable organic matters of heterotrophic bacteria; $M_{H,NH}(t)$ was the Monod item of the substrate limit using ammonia nitrogen; $M_{H,O}(t)$ was the Monod item of the oxygen limit of heterotrophic bacteria; $M_{H,NO_3}(t)$ was the Monod item of the nitrate nitrogen limit; $M_{H,NO_2}(t)$ was the Monod item of the nitrite nitrogen limit; $M_{H,NO}(t)$ was the Monod item of the nitric oxide limit; $M_{H,N_2O}(t)$ was the Monod item of the nitrous oxide limit; $M_{ANRA,NO_3}(t)$ was the Monod item of the nitrate nitrogen limit during the assimilative reduction of nitrate into nitrite nitrogen; $M_{I,NH}(t)$ was the inhibition Monod item of ammonia nitrogen during the assimilative reduction of nitrate into nitrite nitrogen; $M_{I7,NO_2}(t)$ was the inhibition Monod item of nitrite during the assimilative reduction of nitrate into nitrite nitrogen; $M_{ANRA,NO_2}(t)$ was the Monod item of the nitrite limit during the assimilative reduction of nitrite nitrogen into ammonia nitrogen; and, $M_{H,mDON}(t)$ was the Monod item of the mDON limit produced by heterotrophic bacteria.

The degree of fitting between the calibrated simulated value and the measurement value of mDON and DIN in the effluent was 0.937 ($p<0.05$) and 0.901 ($p<0.05$), respectively, indicating that the accuracy of model simulation was high and the models had been established.

S2: According to the carbon/nitrogen ratio, the ASM-mDON-DIN models of different kinetic equations were selected for collaborative optimization of mDON and DIN in the effluent in the denitrification process to obtain best parameter values, specifically comprising the following steps.

According to the central composite design rule, the value of the process operation parameter carbon/nitrogen ratio was set as 2.5, 4.5 and 6.5, the value of pH was set as 6.5, 7.5 and 8.5, and the value of DO was set as 0 mg/L, 0.25 mg/L and 0.5 mg/L.

When the value of the carbon/nitrogen ratio was 2.5, the model 1 was selected; and, when the value of the carbon/nitrogen ratio was 4.5 and 6.5, the model 2 was selected.

By using the carbon/nitrogen ratio, pH and DO in the process operation parameter values as design factors of the response surface methodology and the sum of the concentration of mDON and the concentration of DIN in the effluent as a response value (See FIGS. 1A-1C), the predicted value of the sum of the concentration of mDON and the concentration of DIN was shown in Table 4:

TABLE 4

Figure 1A:
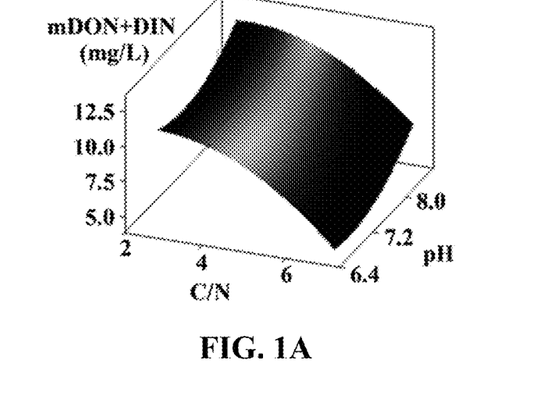
FIG. 1A is a graph of the sum of the concentration of mDON and the concentration of DIN and the carbon/nitrogen ratio (C/N)
Figure 1B:
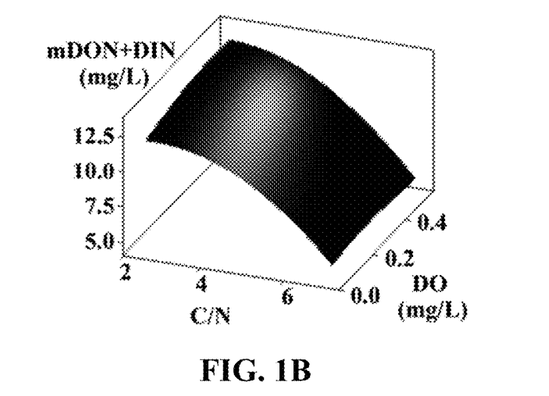
FIG. 1B is a graph of the sum of the concentration of mDON and the concentration of DIN and the pH.
Figure 1C:
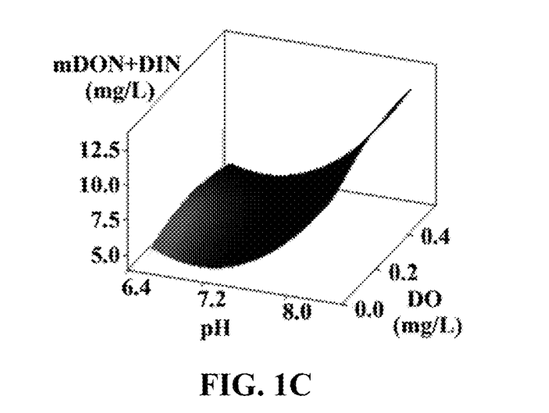
FIG. 1C is a graph of the sum of the concentration of mDON and the concentration of DIN and the dissolved oxygen (DO).

Predicted value of the sum of the concentration of mDON and the concentration of DIN in the effluent under different process parameters

| C/N | pH | DO (mg/L) | mDON + DIN (mg/L) |
| --- | --- | --- | --- |
| 2.50 | 6.50 | 0.00 | 10.58 |
| 6.50 | 6.50 | 0.00 | 6.04 |
| 2.50 | 6.50 | 1.00 | 18.56 |
| 6.50 | 6.50 | 1.00 | 13.37 |
| 4.50 | 7.50 | 0.50 | 10.24 |
| 2.50 | 8.50 | 0.00 | 10.66 |
| 6.50 | 8.50 | 0.00 | 6.40 |
| 2.50 | 8.50 | 1.00 | 17.62 |
| 6.50 | 8.50 | 1.00 | 14.32 |

The minimum value of the sum of the concentration of mDON and the concentration of DIN in the effluent and the corresponding process operation parameters were obtained. When the minimum value of the sum of the concentration of mDON and the concentration of DIN was 5.56 mg/L, the carbon/nitrogen ratio was 5.65, pH was 6.74, and DO was 0.30 mg/L.

It will be obvious to those skilled in the art that changes and modifications may be made, and therefore, the aim in the appended claims is to cover all such changes and modifications.

The invention claimed is:

1. A method, comprising:
   S1: establishing a model 1 and a model 2 for simultaneous simulation of microbial dissolved organic nitrogen (mDON) and inorganic nitrogen (DIN) in denitrification processes; and
   S2: selecting the model 1 or the model 2 according to a set carbon/nitrogen ratio to collaboratively optimize concentration values of mDON and DIN in an effluent of a denitrification process, to obtain best process operation parameter values;
   wherein:
   in S1, operations for establishing the models 1 and 2 comprise:
      S1-1: data collection: measuring chemical oxygen demand (COD), total nitrogen (TN), inorganic nitrogen (iDIN), dissolved organic nitrogen (rDON) and pH in an influent of a target sewage plant in the denitrification process, inorganic nitrogen (eDIN) and dissolved organic nitrogen (eDON) in the effluent, dissolved oxygen (DO), a hydraulic retention time (t) of a denitrification stage, and a mixed liquor suspended solid (MLSS) of activated sludge;
      S1-2: model construction: according to a kinetic process of production, transformation and consumption of mDON during a complete denitrification process, adding mDON as a new component and a carbon/nitrogen ratio as a new parameter into an activated sludge model (ASM), and constructing the models 1 and 2 at different carbon/nitrogen ratios by using mDON and DIN as objects;
      S1-3: model initialization: initializing the models 1 and 2 based on data collected in S1-1, calculated values of model parameters and the models 1 and 2 constructed in S1-2;
      S1-4: model calibration: calibrating a parameter estimation function based on simulated mDON and DIN kinetics and a result of sensitivity analysis; and
      S1-5: model establishment: replacing initial parameter values in the models 1 and 2 with parameter calibration values to obtain calibrated models 1 and 2;
   values of 10 components and 9 processes are modeled in the model 1 by using 22 parameters and a kinetic parameter of an inhibition constant ($K_{IAS}$) of the anoxic substrate of heterotrophic bacteria; and the values of the 10 components and the 9 processes are modeled in the model 2 by using the 22 parameters; wherein:
      the 10 components comprise: heterotrophic bacteria $X_H$, particulate inert substance $X_I$, dissolved biodegradable organic matter $S_S$, microbial organic nitrogen $S_{mDON}$, ammonia nitrogen $S_{NH}$, nitrate nitrogen $S_{NO_3}$, nitrite nitrogen $S_{NO_2}$, nitric oxide $S_{NO}$, nitrous oxide $S_{N2O}$ and alkalinity $S_{ALK}$;
      the 9 processes comprise: four-step anoxic growth of heterotrophic bacteria based on the dissolved biodegradable organic matter, comprising conversion of nitrate nitrogen into nitrite nitrogen, conversion of nitrite nitrogen into nitric oxide, conversion of nitric oxide into nitrous oxide and conversion of nitrous oxide into nitrogen, and decay of heterotrophic bacteria, ammonification of microbial dissolved organic nitrogen, assimilative reduction of nitrate nitrogen into nitrite nitrogen and assimilative reduction of nitrite nitrogen into ammonia nitrogen; and
      the 22 parameters comprise: a yield coefficient $Y_H$ of anoxic $S_S$-based growth of heterotrophic bacteria, an oxygen containing proportion $i_{XB}$ of organism, a proportion $f_{H,DON}$ of mDON formed by heterotrophic bacteria based on organism growth, a proportion $f_I$ of inert substances produced by organism, a maximum specific growth rate $\mu_H$ of anoxic growth of heterotrophic bacteria, a half-saturation utilization constant $K_S$ of a substrate of heterotrophic bacteria, an ammonia half-saturation constant $K_{H,NH}$ of heterotrophic bacteria, an anoxic growth factor $\eta_2$ of heterotrophic bacteria in a process 2, the anoxic growth factor $\eta_3$ of heterotrophic bacteria in a process 3, the anoxic growth factor $\eta_4$ of heterotrophic bacteria in a process 4, the nitrate nitrogen half-saturation constant $K_{NO_3}$, a nitrite nitrogen half-saturation constant $K_{NO_2}$, a nitric oxide half-saturation constant $K_{NO}$, a nitrous oxide half-saturation constant $K_{N_2O}$, a decay coefficient $b_H$ of heterotrophic bacteria, an ammoniated mDON half-saturation constant $K_{H,DON}$ of heterotrophic bacteria, an ammonification rate $\kappa_a$ of microbial dissolved organic nitrogen, a $NO_3^-$-N half-saturation constant $K_{7,NO3}$ of ANRA, an inhibition constant $K_{17NH}$ of ammonia nitrogen in the ANRA process, an inhibition constant $K_{18NO2}$ of nitrite nitrogen in the ANRA process, a half-saturation constant $K_{8,NO2}$ of nitrite nitrogen in the ANRA process and an oxygen half-saturation constant $K_{H,O}$ of heterotrophic bacteria;
   the models 1 and 2 are divided according to the carbon/nitrogen ratio in the influent:
   (1) when the carbon/nitrogen ratio is less than or equal to 4, the model 1 is selected, and the kinetic equations for the model 1 are as follows:

$$DIN(S_{DIN}): \frac{dS_{DIN}}{dt} = \left(-i_{XB} - \frac{f_{H,DON}}{Y_H}\right)(V_1 + V_2 + V_3 + V_4) + V_6 + \left(-\frac{1 + 2.86 f_{H,DON}}{0.571 Y_H} + \frac{1}{0.571}\right)V_2;$$

$$mDON(S_{mDON}): \frac{dS_{mDON}}{dt} = \frac{f_{H,DON}}{Y_H}(V_1 + V_2 + V_3 + V_4) - V_6;$$

$$\text{heterotrophic bacteria}(X_H): \frac{dX_H}{dt} = V_1 + V_2 + V_3 + V_4 - V_5;$$

$$\text{particulate inert substance}(X_I): \frac{dX_I}{dt} = f_I V_5;$$

$$\text{dissolved biodegradable organic matter}(S_S): \frac{dS_S}{dt} = -\frac{1}{Y_H}(V_1 + V_2 + V_3 + V_4) - 1.14 V_7 - 3.43 V_8;$$

$$\text{nitric oxide}(S_{NO}): \frac{dS_{NO}}{dt} = \left(\frac{1 + 2.86 f_{H,DON}}{0.571 Y_H} - \frac{1}{0.571}\right)V_2 + \left(-\frac{1 + 2.86 f_{H,DON}}{0.571 Y_H} + \frac{1}{0.571}\right)V_3;$$

nitrous oxide($S_{N2O}$): $\dfrac{dS_{N2O}}{dt} =$ $\left(\dfrac{1+2.86f_{H,DON}}{0.571Y_H} - \dfrac{1}{0.571}\right)V_3 + \left(-\dfrac{1+2.86f_{H,DON}}{0.571Y_H} + \dfrac{1}{0.571}\right)V_4;$ alkalinity($S_{ALK}$): $\dfrac{dS_{ALK}}{dt} = \left(-\dfrac{i_{XB}}{14} - \dfrac{f_{H,DON}}{14Y_H}\right)V_1 - \left(\dfrac{i_{XB}}{14} + \dfrac{f_{H,DON}}{14Y_H} - \dfrac{1+2.86f_{H,DON}-Y_H}{14\cdot(0.571Y_H)}\right)V_2 +$ $\left(-\dfrac{i_{XB}}{14} - \dfrac{f_{H,DON}}{14Y_H}\right)V_3 + \left(-\dfrac{i_{XB}}{14} - \dfrac{f_{H,DON}}{14Y_H}\right)V_4 + \dfrac{1}{14}V_6 + \dfrac{1}{7}V_8;$ (2) when the carbon/nitrogen ratio is greater than 4, the model 2 is selected, and the kinetic equations for the model 2 are as follows:

DIN($S_{DIN}$): $\dfrac{dS_{DIN}}{dt} =$ $\left(-i_{XB} - \dfrac{f_{H,DON}}{Y_H}\right)(V_1 + V_2' + V_3 + V_4') + V_6 + \left(-\dfrac{1+2.86f_{H,DON}}{0.571Y_H} + \dfrac{1}{0.571}\right)V_2';$ mDON($S_{mDON}$): $\dfrac{dS_{mDON}}{dt} = \dfrac{f_{H,DON}}{Y_H}(V_1 + V_2' + V_3 + V_4') - V_6;$ heterotrophic bacteria($X_H$): $\dfrac{dX_H}{dt} = V_1 + V_2' + V_3 + V_4' - V_5;$ particulate inert substance($X_I$): $\dfrac{dX_I}{dt} = f_I V_5;$ dissolved biodegradable organic matter($S_S$): $\dfrac{dS_s}{dt} = -\dfrac{1}{Y_H}(V_1 + V_2' + V_3 + V_4') - 1.14V_7 - 3.43V_8;$ nitric oxide($S_{NO}$): $\dfrac{dS_{NO}}{dt} =$ $\left(\dfrac{1+2.86f_{H,DON}}{0.571Y_H} - \dfrac{1}{0.571}\right)V_2' + \left(-\dfrac{1+2.86f_{H,DON}}{0.571Y_H} + \dfrac{1}{0.571}\right)V_3;$ nitrous oxide($S_{N2O}$): $\dfrac{dS_{N2O}}{dt} =$ $\left(\dfrac{1+2.86f_{H,DON}}{0.571Y_H} - \dfrac{1}{0.571}\right)V_3 + \left(-\dfrac{1+2.86f_{H,DON}}{0.571Y_H} + \dfrac{1}{0.571}\right)V_4';$ alkalinity($S_{ALK}$): $\dfrac{dS_{ALK}}{dt} = \left(-\dfrac{i_{XB}}{14} - \dfrac{f_{H,DON}}{14Y_H}\right)V_1 - \left(\dfrac{i_{XB}}{14} + \dfrac{f_{H,DON}}{14Y_H} - \dfrac{1+2.86f_{H,DON}-Y_H}{14\cdot(0.571Y_H)}\right)V_2' +$ $\left(-\dfrac{i_{XB}}{14} - \dfrac{f_{H,DON}}{14Y_H}\right)V_3 + \left(-\dfrac{i_{XB}}{14} - \dfrac{f_{H,DON}}{14Y_H}\right)V_4' + \dfrac{1}{14}V_6 + \dfrac{1}{7}V_8.$ 2. The method of claim 1, wherein in S2 operations for selecting collaborative optimization parameters comprise:

S2-1: setting process parameter values: determining set values of carbon/nitrogen ratio, pH and dissolved oxygen;

S2-2: model selection: selecting the ASM mDON DIN model 1 or 2 according to a numerical value of the carbon/nitrogen ratio in S2-1;

S2-3: collaborative optimization: based on the model selected in S2-2, obtaining a minimum value of a sum of a concentration of organic nitrogen and a concentration of inorganic nitrogen in the effluent and corresponding process operation parameters by using the process parameter values set in S2-1 as a design factor of a response surface methodology and the sum of the concentration of organic nitrogen and the concentration of inorganic nitrogen in the effluent as a response value; and S2-4: outputting best parameter values: outputting the minimum value of the sum of the concentration of inorganic nitrogen and the concentration of organic nitrogen in the effluent and the corresponding process operation parameters comprising the carbon/nitrogen ratio, pH and dissolved oxygen, obtained in S2-3.

3. The method of claim 1, wherein the calculated values of model parameters comprise initial values of a yield coefficient ($Y_H$) of anoxic growth of heterotrophic bacteria calculated based on the data collected in S1-1, a proportion ($f_{H,DON}$) of mDON formed by heterotrophic bacteria based on organism growth, an ammoniated mDON half-saturation constant ($K_{H,DON}$) of heterotrophic bacteria, a maximum specific growth rate ($\mu_H$) of heterotrophic bacteria and a nitrate half-saturation constant ($K_{NO_3}$) of heterotrophic bacteria.

4. The method of claim 1, wherein inorganic nitrogen component $S_{DIN}$ comprises ammonia nitrogen, nitrate nitrogen and nitrite nitrogen.

5. The method of claim 1, wherein models 1 and 2 comprise 8 process rate expressions respectively, which are $V_1$-$V_8$ and $V_1'$-$V_8'$:

(1) anoxic growths ($V_1$ and $V_1'$) of heterotrophic bacteria based on dissolved biodegradable organic matters ($S_s$) are:

$V_1 = \mu_H \cdot X_H(t) \cdot M_{H,S_s}(t) \cdot M_{H,NH}(t) \cdot M_{H,NO_3}(t) \cdot M_{H,O}(t);$ $V_1' = V_1;$ (2) anoxic growths ($V_2$ and $V_2'$) of heterotrophic bacteria based on dissolved biodegradable organic matters are:

$V_2 = \mu_H \cdot \eta_2 \cdot X_H(t) \cdot M_{H,S_s}(t) \cdot M_{H,NH}(t) \cdot M_{H,NO_2}(t) \cdot M_{H,O}(t);$ $V_2' = \alpha \cdot \mu_H \cdot \eta_2 \cdot X_H(t) \cdot M_{H,S_s}(t) \cdot M_{H,NH}(t) \cdot M_{H,NO_2}(t) \cdot M_{H,O}(t);$ (3) anoxic growths ($V_3$ and $V_3'$) of heterotrophic bacteria based on dissolved biodegradable organic matters are:

$V_3 = \mu_H \cdot \eta_3 \cdot X_H(t) \cdot M_{H,S_s}(t) \cdot M_{H,NH}(t) \cdot M_{H,NO}(t) \cdot M_{H,O}(t);$ $V_3' = V_3;$ (4) anoxic growths ($V_4$ and $V_4'$) of heterotrophic bacteria based on dissolved biodegradable organic matters are:

$V_4 = \mu_H \cdot \eta_4 \cdot X_H(t) \cdot M_{H,I,S_s}(t) \cdot M_{H,NH}(t) \cdot M_{H,N_2O}(t) \cdot M_{H,O}(t);$ $V_4' = \alpha \cdot \mu_H \cdot \eta_4 \cdot X_H(t) \cdot M_{H,S_s}(t) \cdot M_{H,NH}(t) \cdot M_{H,N_2O}(t) \cdot M_{H,O}(t);$ (5) decays ($V_5$ and $V_5'$) of heterotrophic bacteria are:

$V_5 = b_H \cdot M_{H,NO_3}(t) \cdot X_H(t);$ $V_5' = V_5;$ (6) ammonification ($V_6$ and $V_6'$) of microbial dissolved organic nitrogen $V_6 = \kappa_\alpha \cdot X_H(t) \cdot M_{H,mDON}(t);$ $V_6' = V_6;$ (7) assimilative reduction ($V_7$ and $V_7'$) of nitrate into nitrite is:

$$V_7=1.2 \cdot i_{XB} \cdot M_{ANRA,NO_3}(t) \cdot M_{I,NH}(t) \cdot M_{I7,NO_2}(t)(V_1+V_2+V_3+V_4-V_6);$$

$$V_7'=V_7;$$

(8) assimilative reduction ($V_8$ and $V_8'$) of nitrite into ammonia nitrogen $$V_8=1.2 \cdot i_{XB} \cdot M_{ANRA,NO_2}(t) \cdot M_{I,NH}(t)(V_1+V_2+V_3+V_4-V_6);$$

$$V_8'=V_8;$$

where $M_{H,S_s}(t)$ is a Monod item of the substrate limit using the dissolved biodegradable organic matters of heterotrophic bacteria; $H_{M,I,S_s}(t)$ is an inhibition Monod item of the dissolved biodegradable organic matters of heterotrophic bacteria; $M_{H,NH}(t)$ is a Monod item of the substrate limit using ammonia nitrogen; $M_{H,O}(t)$ is a Monod item of the oxygen limit of heterotrophic bacteria; $M_{H,NO_3}(t)$ is a Monod item of the nitrate nitrogen limit; $M_{H,NO_2}(t)$ is a Monod item of the nitrite nitrogen limit; $M_{H,NO}(t)$ is a Monod item of the nitric oxide limit; $M_{H,N_2O}(t)$ is a Monod item of the nitrous oxide limit; $M_{ANRA,NO_3}(t)$ is a Monod item of the nitrate nitrogen limit during the assimilative reduction of nitrate into nitrite nitrogen; $M_{I,NH}(t)$ is an inhibition Monod item of ammonia nitrogen during the assimilative reduction of nitrate into nitrite nitrogen; $M_{17,NO_2}(t)$ is an inhibition Monod item of nitrite during the assimilative reduction of nitrate into nitrite nitrogen; $M_{ANRA,NO_2}(t)$ is a Monod item of the nitrite limit during the assimilative reduction of nitrite nitrogen into ammonia nitrogen; and, $M_{H,mDON}(t)$ is a Monod item of the mDON limit produced by heterotrophic bacteria.

6. The method of claim 1, wherein the influent of the denitrification process in the target sewage plant satisfies the following conditions: 15° C.<environmental temperature <25° C., 2000 mg/L<sludge concentration <5000 mg/L, 10 d<sludge age <30 d, 0<carbon/nitrogen ratio≤6.5, 6.5<pH≤8.5, and 0≤dissolved oxygen≤0.5.

7. The method of claim 1, wherein the sensitivity analysis uses an absolute-relative sensitivity equation to calculate the influences of parameter changes on mDON and DIN.

8. A method, comprising:
S1: establishing a model 1 and a model 2 for simultaneous simulation of microbial dissolved organic nitrogen (mDON) and inorganic nitrogen (DIN) in denitrification processes; and
S2: selecting the model 1 or the model 2 according to a set carbon/nitrogen ratio to collaboratively optimize concentration values of mDON and DIN in an effluent of a denitrification process, to obtain best process operation parameter values;
wherein:
in S1, operations for establishing the models 1 and 2 comprise:
S1-1: data collection: measuring chemical oxygen demand (COD), total nitrogen (TN), inorganic nitrogen (iDIN), dissolved organic nitrogen (rDON) and pH in an influent of a target sewage plant in the denitrification process, inorganic nitrogen (eDIN) and dissolved organic nitrogen (eDON) in the effluent, dissolved oxygen (DO), a hydraulic retention time (t) of a denitrification stage, and a mixed liquor suspended solid (MLSS) of activated sludge;
S1-2: model construction: according to a kinetic process of production, transformation and consumption of mDON during a complete denitrification process, adding mDON as a new component and a carbon/nitrogen ratio as a new parameter into an activated sludge model (ASM), and constructing the models 1 and 2 at different carbon/nitrogen ratios by using mDON and DIN as objects;
S1-3: model initialization: initializing the models 1 and 2 based on data collected in S1-1, calculated values of model parameters and the models 1 and 2 constructed in S1-2;
S1-4: model calibration: calibrating a parameter estimation function based on simulated mDON and DIN kinetics and a result of sensitivity analysis; and
S1-5: model establishment: replacing initial parameter values in the models 1 and 2 with parameter calibration values to obtain calibrated models 1 and 2; and the sensitivity analysis uses an absolute-relative sensitivity equation to calculate the influences of parameter changes on mDON and DIN.

* * * * *